(12) United States Patent
Chen et al.

(10) Patent No.: US 11,547,133 B2
(45) Date of Patent: Jan. 10, 2023

(54) COOKING APPARATUS FOR REDUCING A CONTENT OF PHYTIC ACID AND PHYTATE CONTAINED IN FOODSTUFF

(71) Applicant: KONINKLIJKE PHILIPS N.V., Eindhoven (NL)

(72) Inventors: Yun Chen, Shanghai (CN); Jingwei Tan, Shanghai (CN); Weihua Lu, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 237 days.

(21) Appl. No.: 16/966,048

(22) PCT Filed: Jan. 23, 2019

(86) PCT No.: PCT/EP2019/051570
§ 371 (c)(1),
(2) Date: Jul. 30, 2020

(87) PCT Pub. No.: WO2019/149585
PCT Pub. Date: Aug. 8, 2019

(65) Prior Publication Data
US 2020/0359662 A1 Nov. 19, 2020

(30) Foreign Application Priority Data

Feb. 5, 2018 (WO) ................ PCT/CN2018/075285
May 1, 2018 (EP) .................................... 18170223

(51) Int. Cl.
*A23L 11/30* (2016.01)
*A23L 5/20* (2016.01)
*A23L 7/10* (2016.01)

(52) U.S. Cl.
CPC ................ *A23L 5/21* (2016.08); *A23L 7/197* (2016.08); *A23L 11/31* (2016.08); *A23V 2002/00* (2013.01)

(58) Field of Classification Search
CPC .......... A23L 5/21; A23L 7/197; A23L 7/1975; A23L 11/31; A23L 11/30–11/37;
(Continued)

(56) References Cited

U.S. PATENT DOCUMENTS 3,660,111 A * 5/1972 Koch ...................... A23L 25/20
426/632
3,876,807 A * 4/1975 Wagner ................... A23L 11/01
426/431
(Continued)

FOREIGN PATENT DOCUMENTS

CN 103070244 5/2013
JP 2007068451 3/2007
(Continued)

OTHER PUBLICATIONS

International Search Report and Written Opinion dated Feb. 25, 2019 for International Application No. PCT/EP2019/051570 filed Jan. 23, 2019.

*Primary Examiner* — Drew E Becker
(74) *Attorney, Agent, or Firm* — Maschoff Brennan

(57) ABSTRACT

An apparatus and a method for soaking foodstuff in a liquid under set acid pH conditions of the liquid is described. The foodstuff is soaked in the liquid so as to reduce a content of phytic acid and/or phytate contained in the foodstuff. The apparatus has a vessel for receiving the foodstuff and the liquid for soaking the foodstuff within the vessel. The apparatus further has an amount determining system which is configured to determine an amount of the liquid and/or an amount of the foodstuff to be used for the soaking within the vessel. Further, the apparatus has a pH adjusting system
(Continued)

configured to perform an electrolysis of at least a portion of the liquid for adjusting a pH level of the liquid.

13 Claims, 4 Drawing Sheets

(58) Field of Classification Search
CPC ..... A23L 5/20; A23L 3/32–3/325; A23L 5/13; A23L 7/143–7/148; A23L 11/01–11/03; A23V 2300/12; A23N 15/06
See application file for complete search history.

(56) References Cited

U.S. PATENT DOCUMENTS

| | | | |
|---|---|---|---|
| 4,855,159 A * | 8/1989 | Takao | A21D 2/362 426/507 |
| 6,033,692 A * | 3/2000 | Chukwu | A23B 7/0205 426/52 |
| 6,238,725 B1 | 5/2001 | Bush | |
| 6,602,534 B1 | 8/2003 | Rose | |
| 2009/0155386 A1* | 6/2009 | Avenne | A23L 3/325 424/680 |
| 2014/0154373 A1* | 6/2014 | Gobet | A23L 3/325 426/244 |
| 2015/0250212 A1* | 9/2015 | Diaz | A21D 8/02 426/511 |
| 2017/0099861 A1* | 4/2017 | Vercauteren | A23L 11/01 |
| 2019/0069578 A1* | 3/2019 | Washio | A23L 2/68 |

FOREIGN PATENT DOCUMENTS

| | | |
|---|---|---|
| WO | 98/11788 | 3/1998 |
| WO | 2011/060337 | 5/2011 |
| WO | 2014/016398 | 1/2014 |
| WO | 2015/191966 | 12/2015 |
| WO | 2017081420 | 5/2017 |
| WO | 2017/178650 | 10/2017 |

* cited by examiner

COOKING APPARATUS FOR REDUCING A CONTENT OF PHYTIC ACID AND PHYTATE CONTAINED IN FOODSTUFF

CROSS REFERENCE TO RELATED APPLICATIONS

This application is the U.S. National Phase application under 35 U.S.C. § 371 of International Application No. PCT/EP2019/051570 filed Jan. 23, 2019, published as WO 2019/149585 on Aug. 8, 2019, which claims the benefit of European Patent Application Number 18170223.4 filed May 1, 2018 and Patent Application Number PCT/CN2018/075285 filed Feb. 5, 2018. These applications are hereby incorporated by reference herein.

FIELD OF THE INVENTION

The present invention relates to an apparatus and a method for soaking foodstuff in a liquid, such as in water, under controlled conditions of temperature and/or pH of the liquid.

BACKGROUND

Phytic acid (also known as myoinositol hexaphosphate, IP6) or its salt form, phytate, is the storage form of phosphorus found in many plants, contained in large amounts in the bran or in the shell of grains, in nuts and seeds. Herbivores easily digest phytic acid, but humans cannot.

Concerns about the presence of phytic acid and phytates in food for humans have been raised based on evidence that phytic acid and phytates decrease the bioavailability of many essential minerals by interacting with multivalent cations and/or proteins to form complexes that may be insoluble or otherwise unavailable under physiologic conditions. Specifically, phytic acid forms salts with minerals it encounters in the digestive tract. Such minerals include iron, magnesium, copper, etc. and are seed-derived minerals consumed in the meal, or, in cases like zinc, from "endogenous stores" which are already in the individual consuming the meal. The salts formed between phytic acid and the minerals prevent these minerals from being absorbed into the body, which can lead to calcium, iron and zinc deficiencies. On the other hand, humans easily absorb these minerals when phytic acid and phytate are not present. Since phytic acid and phytate chemically tie up key nutrients, they are also called "antinutritional factors", or "antinutrients".

There are several processing techniques known for reducing the content of phytic acid and phytate in foodstuff, such as dehulling, germination, and fermentation. However, some these techniques are time-consuming and complex, making it difficult to use them in industrial food preparation processes. Also for this reason, these techniques cannot be carried out by consumers at home. Others of these techniques can be applied at home but are not efficient enough in reducing the content of phytic acid and phytate and reduce also the content of other nutrients due to high temperatures and due to the leaching out effect.

Accordingly, a need exists for providing an apparatus and a method which provide more efficient food preparation for reducing a content of phytic acid and/or phytate in food.

SUMMARY OF THE INVENTION

Embodiments provide an apparatus for soaking foodstuff in a liquid under set acid pH conditions of the liquid which are set by the apparatus so as to reduce a content of phytic acid and/or phytate contained in the foodstuff. The apparatus includes a vessel for receiving the foodstuff and for receiving the liquid for soaking the foodstuff within the vessel. The apparatus further includes an amount determining system which is configured to determine an amount of the liquid and/or an amount of the foodstuff to be used for the soaking within the vessel.

The soaking process may include immersing the foodstuff in the liquid for a predetermined amount of time. The soaking time may be longer than 10 minutes, or longer than 20 minutes or longer than 30 minutes, or longer than 60 minutes. The soaking process may result in an increased water content in the foodstuff. The foodstuff may include solid foodstuff, such as plant food, in particular dry fruits, nuts and/or seeds, such as grains. By way of example, the foodstuff may include whole grains and/or legumes.

The liquid may be water or may substantially be water. The liquid may be contain water as a primary constituent.

Whole grains may be defined herein as grains of any cereal and/or pseudocereal that contain the endosperm, germ, and bran. In other words, whole grains may be defined to include the intact, ground, cracked, or flaked caryopsis (fruit or kernel) of the grain whose principal components, the starchy endosperm, germ, and bran, are present in the same relative proportions as they exist in the intact grain. Thereby, the term "whole grain" may include whole intact grains and whole grains where the contents of endosperm, bran and germ are in the same proportions as in the intact grain (i.e. whole grains which are cracked, crushed, etc.). The term "grains" may be defined herein to be synonymous with caryopses, the fruits of the grass family. The term grains may be defined to include but is not limited to wheat, rye, barley, oats, brown and red rice, and millet. Legumes may be defined by the seeds of plants, which produce a pod, with seeds contained inside. The term "legumes" may include but is not limited to alfalfa, clover, peas, beans, chickpeas, lentils, lupin bean, mesquite, carob, soybeans, peanuts and tamarind.

At least a portion of the vessel may be made of a heat conductive material, such as metal. A holding capacity of the vessel may be larger than 0.5 liter, larger than 1 liter or larger than 1.5 liter. The holding capacity may be less and then 2,000 liter or less than 1,000 liter. The vessel may include an opening for supplying the foodstuff and/or the liquid to the vessel and/or for removing the foodstuff and/or the liquid from the vessel. The vessel may be in the form of a bowl. The vessel may include an agitator for agitating the foodstuff and/or the liquid.

The amount determining system may be configured to determine the amount of the liquid and/or the amount of the foodstuff by measuring the amount of the liquid and/or the amount of the foodstuff automatically or semi-automatically (i.e. using user-intervention). The amount determining system may be configured to measure an amount of the foodstuff and/or an amount of the liquid when contained within the vessel. Additionally or alternatively, the amount determining system may be configured to perform one or more measurements on the foodstuff and/or on the liquid which, after the measurements have been performed, is supplied to the vessel for performing the soaking process. The amount determining system may be configured to perform the measurements automatically or semi-automatically (i.e. using user intervention).

The amount determining system may be configured to measure a weight and/or a volume the foodstuff and/or of the liquid when contained in the vessel. Additionally, the amount determining system may be configured to measure a fill level or a vertical level of the liquid and/or the foodstuff when contained in the vessel.

According to an embodiment, the amount determining system includes a weighing system. The weighing system may be configured to weigh a content contained in the vessel.

According to a further embodiment, the apparatus further includes a liquid supply system. The liquid supply system may be configured to supply a set amount of the liquid to the vessel. The set amount may be determined by the amount determining system depending on the measured amount of the foodstuff. Additionally or alternatively, the apparatus may include a foodstuff supply system, which is configured to supply a set amount of foodstuff to the vessel. The set amount of foodstuff may be determined by the amount determining system depending on a measured amount of the liquid.

The liquid supply system may be configured for transfer of the liquid between a source of the liquid and the vessel. The liquid supply system may include a liquid supply line for providing a fluid connection between the source of the liquid and the vessel. The liquid supply system may be configured to control a flow of the liquid within the supply line for supplying the set amount of liquid to the vessel. The flow may be controlled by means of a valve of the liquid supply system. The valve may be arranged in the liquid supply line.

According to a further embodiment, the amount determining system is configured to determine the amount of the liquid depending on a class of the foodstuff. The apparatus may include an interface for receiving user input indicative of the class of the foodstuff. Additionally or alternatively, the apparatus may be configured to determine the class of the foodstuff, in particular automatically or semi-automatically. The interface may include one or more manually-operable interface elements, such as one or more switches and/or one or more buttons. The interface may be configured for allowing the user to select at least one class of a plurality of classes of foodstuff. The plurality of classes may be associated with different types of foodstuff, which are to be soaked with different ratios of the amount of liquid to the amount of foodstuff and/or which are to be soaked using different temporal temperature profiles. The apparatus may be configured to select, depending on the user input, a temporal temperature profile and/or a ratio of an amount of the liquid to an amount of the foodstuff. Data, which assign to each of the classes a temporal temperature profile and/or a ratio of the amount of liquid to the amount of foodstuff may be stored in a storage device of the apparatus.

According to a further embodiment, the apparatus includes a pH adjusting system for adjusting a pH level of the liquid.

The pH adjusting system may be configured to adjust a pH level of the liquid within an accuracy of +/−1 pH or within an accuracy of +/−0.5 pH, or within an accuracy of +/−0.3 pH. The pH adjusting system may include a sensor for sensing a pH level of the liquid contained in the vessel and/or for sensing a pH level of an amount of liquid to be supplied to the vessel for soaking the foodstuff. The pH adjusting system may be configured to adjust the pH level of the liquid depending on the sensed pH level.

According to an embodiment, the pH adjusting system is configured to adjust the pH level of the liquid to a value within a range of between 4 and 6.5 or within a range of between 4.5 and 6.0 or within a range of between 4.5 and 5.6.

The pH adjusting system may include a controller which is in signal communication with a pH sensor of the pH adjusting system. The pH sensor of the pH adjusting system may be located inside the vessel and/or outside the vessel. By way of example, the pH sensor may be configured to sense a pH level of an amount of the liquid to be supplied to the vessel. The pH sensor may be configured to sense a pH level of at least a portion of the liquid which is discharged from the pH adjusting system. Additionally or alternatively, the pH sensor may be configured to measure a pH level of the liquid when contained in the vessel. The controller may be in signal communication with the pH sensor. The controller may be configured to generate a control signal for controlling the pH level of the liquid depending on a sensor output received from the pH sensor.

According to a further embodiment, the pH adjusting system is configured to perform an electrolysis of at least a portion of the liquid for adjusting the pH level. The electrolysis may be performed using an electrolysis cell. The electrolysis cell may include an anode chamber and a cathode chamber. At least a portion of the liquid which is discharged from the anode chamber may be supplied to the vessel for soaking the foodstuff. The anode chamber and the cathode chamber may be separated by an ion-conductive membrane.

According a further embodiment, the pH adjusting system is configured to adjust a conductivity of at least a portion of the liquid for performing the electrolysis. The conductivity may be adjusted by adding a salt, in particular a neutral salt, such as sodium chloride (NaCl) or potassium chloride (KCl), at least to a portion of the liquid which is supplied to the electrolysis cell.

According to a further embodiment, the apparatus includes a heater configured to heat a content contained in the vessel. Additionally or alternatively, the heater may be configured to heat at least a portion of the liquid before being supplied to the vessel.

The heater may include one or more resistive heating elements. Additionally or alternatively, the heater may be configured to heat the liquid and/or the foodstuff using electromagnetic radiation, such as microwave radiation and/or infrared radiation. The heater may be configured to emit electromagnetic radiation which then interacts with the foodstuff and/or the liquid.

According to a further embodiment, the apparatus includes a controller which is in signal communication with the heater and which is configured to transmit control signals to the heater for executing one or more temporal heating profiles.

According to a further embodiment, the one or more temporal heating profiles include a temporal heating profile which includes a temperature level within a temperature range of between 30° C. and 70° C., or between 40° C. and 60° C., or between 45° C. and 55° C. The temperature level may be within the temperature range for a time period of between 1 hour and 3 hours or for time period of between 1.5 hours and 2.5 hours. The heating profile may be defined as a function of temperature over time. The heating profile may be stored in a data storage device of the apparatus. The storage device may include a volatile storage device (such as a random access memory (RAM)) and/or a non-volatile storage device (such as a read only memory (ROM)). The heater may include a temperature sensor for measuring the temperature of the liquid and/or of the foodstuff. The temperature sensor may be configured to measure foodstuff and/or liquid which is discharged from the heater and/or which is contained within the vessel. The controller may be in signal communication with the temperature sensor. The controller may be configured to control the heater depending on sensor output received from the temperature sensor.

According to a further embodiment, the one or more temporal heating profiles include a temporal heating profile which includes a temperature level within a temperature range of more than 80° C., or within a temperature range of more than 90° C., or within a temperature range of equal to or greater than 100° C. The temperature level may be within the temperature range for a time period of at least 5 minutes or at least 15 minutes or at least 20 minutes.

According to a further embodiment, the apparatus includes a liquid discharging system for discharging at least a portion of the liquid when contained in the vessel. The liquid discharging system may include one or more liquid discharging lines. The liquid discharging system may include a pump for pumping the liquid to be discharged through the discharging line.

According to a further embodiment, the liquid discharging system is configured as a drainage system for draining at least the portion of the liquid from the vessel. The drainage system may include one or more drainage openings, which are provided in the vessel. The drainage opening may be in fluid communication with one or more liquid drainage lines.

According to a further embodiment, the liquid discharging system is in signal communication with a controller. The controller may be configured to control the discharging system for discharging the liquid.

According to a further embodiment, the amount determining system is configured to determine the amount of the liquid and/or the amount of the foodstuff depending on a predetermined value or depending on a predetermined range of values for a ratio of the amount of the liquid to the amount of the foodstuff. The predetermined value and/or the predetermined range of values for the ratio of the amount of the liquid to the amount of the foodstuff may be stored in a storage device of the apparatus. The predetermined value and/or predetermined range may be within a range of between 0.4 and 4.5 or between 0.5 and 4.

Embodiments provide a method of treating foodstuff by soaking so as to reduce a content of phytic acid and/or phytate contained in the foodstuff. The method comprises supplying an amount of the foodstuff and an amount of the liquid to a vessel. The amount of the foodstuff and/or the amount of the liquid is determined using an amount determining system. The method further comprises soaking the foodstuff and the liquid under a set acid pH condition of the liquid.

According to a further embodiment, the amount of the liquid and the amount of the foodstuff is determined so that a ratio of the amount of the liquid to the amount of the foodstuff is substantially a predefined value and/or is within a predefined range.

According to a further embodiment, the method further comprises selecting the predefined value and/or the predefined range from a plurality of predefined values and/or predefined ranges which are associated with different classes of foodstuff.

According to a further embodiment, the predefined value and/or predefined range is within a range of between 0.4 and 1.5 or between 0.5 and 1.3 or between 0.6 and 1.15 if the foodstuff includes or substantially consists of whole grains.

According to a further embodiment, the predefined value and/or predefined range is within a range of between 1.5 and 4.5 or between 1.8 and 4, or between 2 and 3.8 if the foodstuff includes or substantially consists of legumes.

According to a further embodiment, the method further comprises separating the liquid from the soaked foodstuff after the soaking of the foodstuff. The method may further comprise immersing the soaked foodstuff in a replacement liquid. The method may further comprise heating the foodstuff in the replacement liquid to temperatures above 80° C. or above 90° C. The replacement liquid may consist of water or may substantially consist of water. The replacement liquid may contain further ingredients in addition to water. The replacement liquid may contain water as a primary constituent.

According to a further embodiment, a ratio of an amount of the replacement liquid to an amount of the soaked foodstuff is within a second predetermined range and/or corresponds to a second predetermined value.

According to a further embodiment, the method further comprises selecting the second predefined value and/or the second predefined range from a plurality of predefined ranges and/or predefined values associated with different classes of foodstuff.

According to a further embodiment, the second predefined value and/or the second predefined range is within a range of between 0.5 and 2, or between 0.7 and 1.7, or between 0.9 and 1.5 if the foodstuff includes or substantially consists of whole grains.

According to a further embodiment, the second predefined value and/or the second predefined range is within a range of between 0.5 and 5, or between 0.7 and 4, or between 1 and 3 if the foodstuff includes or substantially consists of the legumes.

These and other aspects of the invention will be apparent from and elucidated with reference to the embodiments described hereinafter.

DETAILED DESCRIPTION OF EXEMPLARY EMBODIMENTS

Figure 1A:
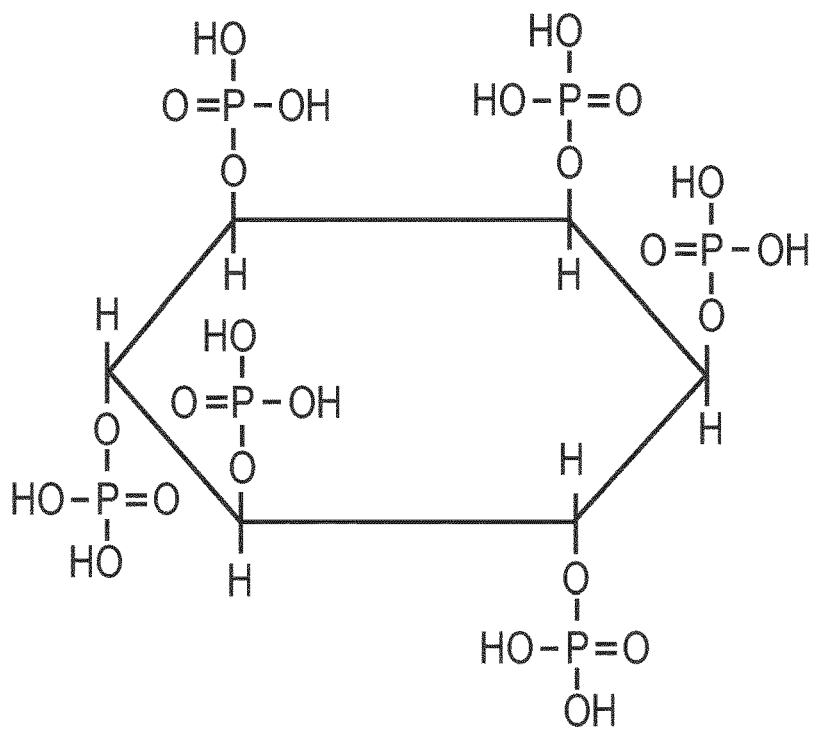
FIG. 1A is a schematic illustration of a phytic acid molecule.

FIG. 1A is a schematic illustration of the molecular structure of phytic acid which is a phosphoric acid ester of inositol, in which each of the six hydroxyl groups has been esterified with a molecule of orthophosphoric acid. Its molecular formula is $C_6H_{18}O_{24}P_6$. Since orthophosphoric acid is a tribasic acid and since only one hydrogen is affected in the esterification with the hydroxyl group of the inositol, each molecule of phosphoric acid is still functional as a dibasic acid. Since there are six of these phosphoric acid molecules now associated with inositol in the ester, the ester functions as a dodecabasic acid.

Figure 1B:
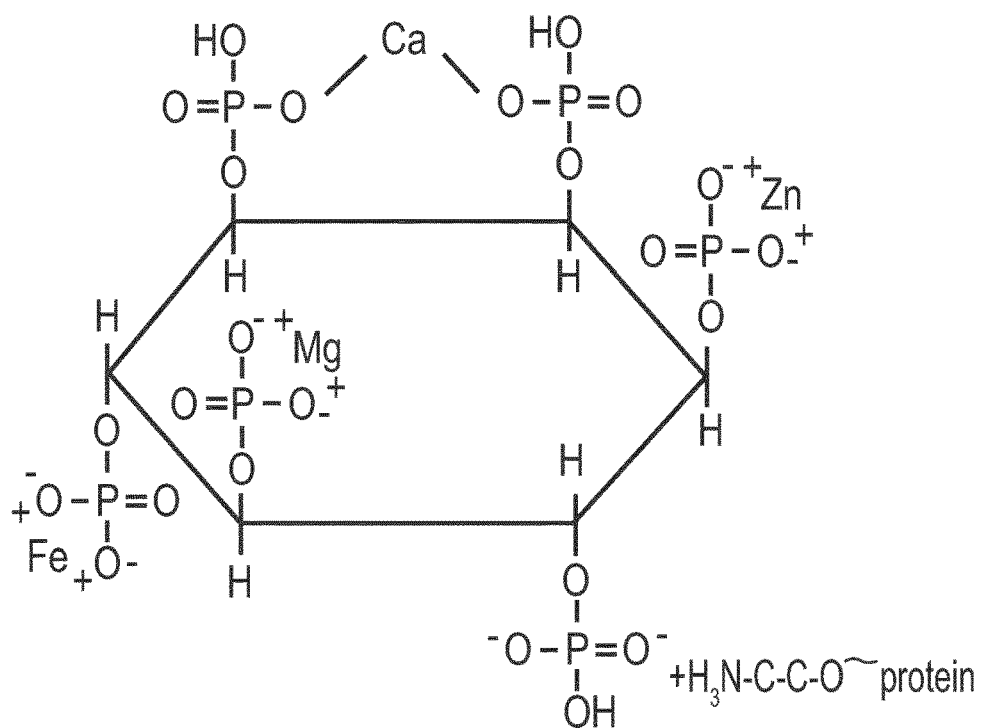
FIG. 1B is a schematic illustration of the phytic acid molecule after it has bound cations of calcium (Ca), zinc (Zn), iron (Fe), and magnesium (Mg) to form phytate.

Phytate has a strong chelating property by forming complexes with divalent cations, proteins and amino acids. This is schematically illustrated in FIG. 1B, showing a phytic acid molecule complexed with cations of iron (Fe), calcium (Ca), magnesium (Mg) and zinc (Zn) as well as a protein.

The phytate salts are insoluble salts making the bound minerals and proteins unavailable for absorption by the body. Therefore, from a nutritional point of view, phytic acid and phytates decrease the value of food by chelating important minerals, such as iron, zinc, magnesium, and calcium. Because of these properties, phytic acid and phytate have been called anti-nutrients. In sufficiently high concentrations, they can reduce the bioavailability of minerals and proteins.

However, it has been found that it is possible to activate phytase, which is an enzyme contained many foods and which, when activated, breaks up phytic acid and phytate by thermal hydrolysis. Phytase can stepwise cleave phosphate groups into lower phosphorylated inositol phosphates and inorganic phosphate. When phytate is hydrolyzed by phytase, the complex between phytate and minerals or between phytate and protein are as well destroyed. Thereby, the minerals and the protein is released.

Activation of phytase can be achieved by soaking the foodstuff in an acidic liquid and at warm temperatures, the acidic medium preferably being water. It has further been shown that the amount by which phytic acid and phytate is reduced using activated phytase depends on a ratio of an amount of the liquid to the amount of the foodstuff. A further improvement can be achieved if the ratio is determined depending on the foodstuff to be soaked.

Figure 2:
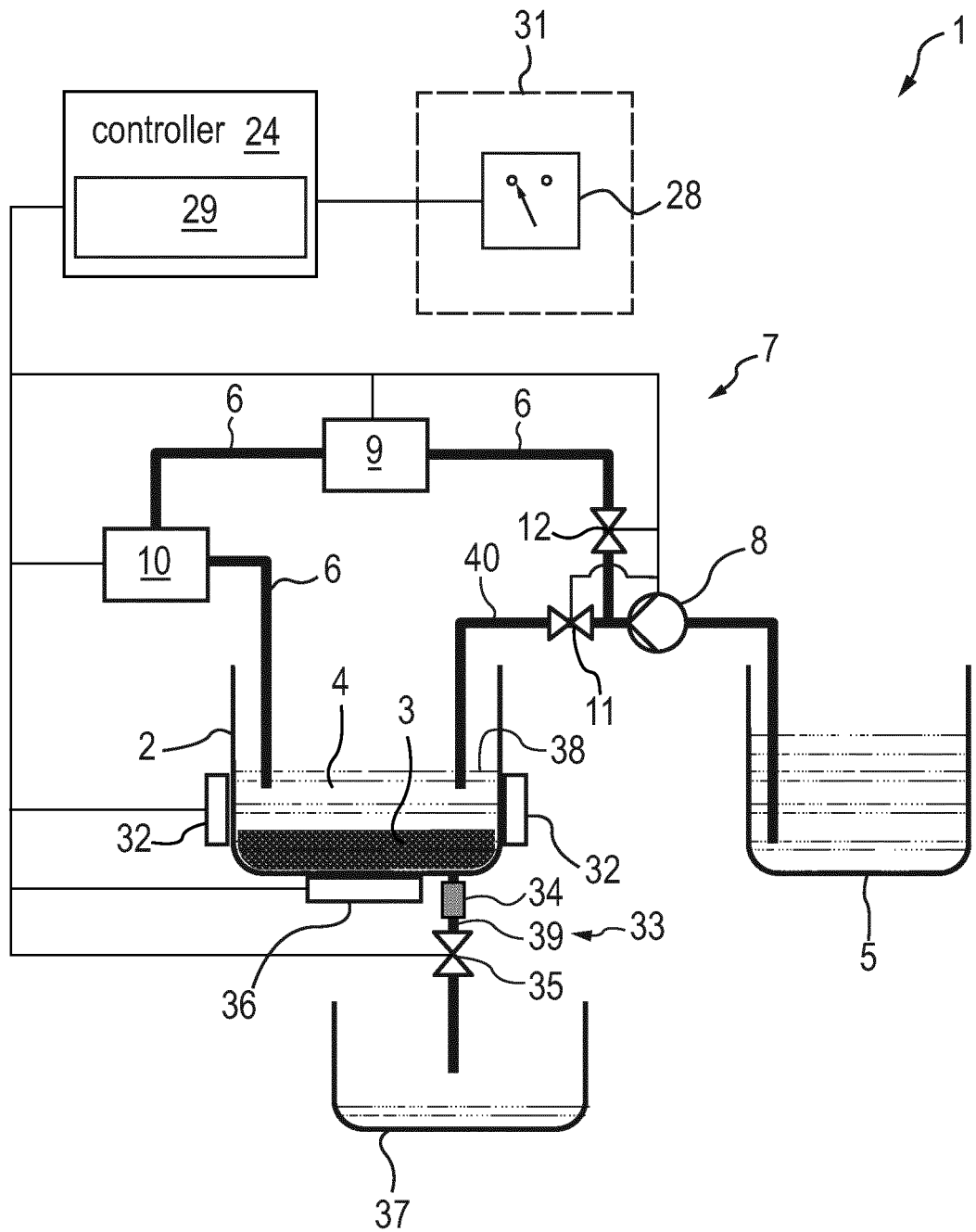
FIG. 2 is a schematic illustration of an apparatus for soaking foodstuff in a liquid under set acid pH conditions according to an exemplary embodiment.

FIG. 2 is a schematic illustration of an apparatus 1 for soaking foodstuff 3, according to an exemplary embodiment. The foodstuff may include, for example, whole grains and/or legumes. The foodstuff is soaked in a liquid 4, such as water, under set pH condition of the liquid, the pH conditions being set, i.e. controlled, by the apparatus 1. The reduction of the phytic acid and/or phytate is achieved through activation of phytase which is contained in the foodstuff. Soaking the foodstuff using the apparatus 1 according to the exemplary embodiment allows for a reduction of the content of phytic acid and/or phytate to a lower level.

The apparatus 1 includes a vessel 2 for receiving the foodstuff 3 and the liquid 4 so that the foodstuff 3 is immersed in the liquid 4 within the vessel. The liquid 4 is supplied to the vessel 2 from a liquid reservoir tank 5 through a liquid supply system 7, which includes a pump 8 for generating a flow of the liquid through supply lines 6 and 40 of the liquid supply system 7.

After the foodstuff 3 has been introduced into the vessel 2, by activating the liquid supply system 7, an amount of liquid is added to the foodstuff 3 so that the foodstuff 3 is immersed in the liquid 4 for performing the soaking process. To this end, a first supply valve 12 of the liquid supply system 7 is brought into an open position. Thereby, the liquid to be supplied to the vessel 2 is caused to flow through a pH adjusting system 7 and through a first heater 10 which are arranged in the liquid supply line 6 of the liquid supply system 7.

The pH adjusting system 9 is configured to adjust the pH level of the liquid before being supplied to the vessel 2. The pH adjusting system 9 is configured to adjust the pH level of the liquid within a range of acid pH levels. It has been shown that the acid pH levels lead to a reduction of phytic acid and phytate in the foodstuff to lower values. In particular, the pH adjusting system 9 may be configured to adjust the pH level of the liquid in the vessel to be within a range of between 4 and 6.5, or within a range of between 4.5 and 6, or within a range of between 4.5 and 5.6

The pH adjusting system 7 is configured to perform electrochemical pH control of the liquid. In particular, the pH adjusting system 7 is configured to adjust the pH level of the liquid by performing an electrolysis of at least a portion of the liquid which flows through the liquid supply line 6. This is explained in detail with reference to FIG. 3.

Figure 3:
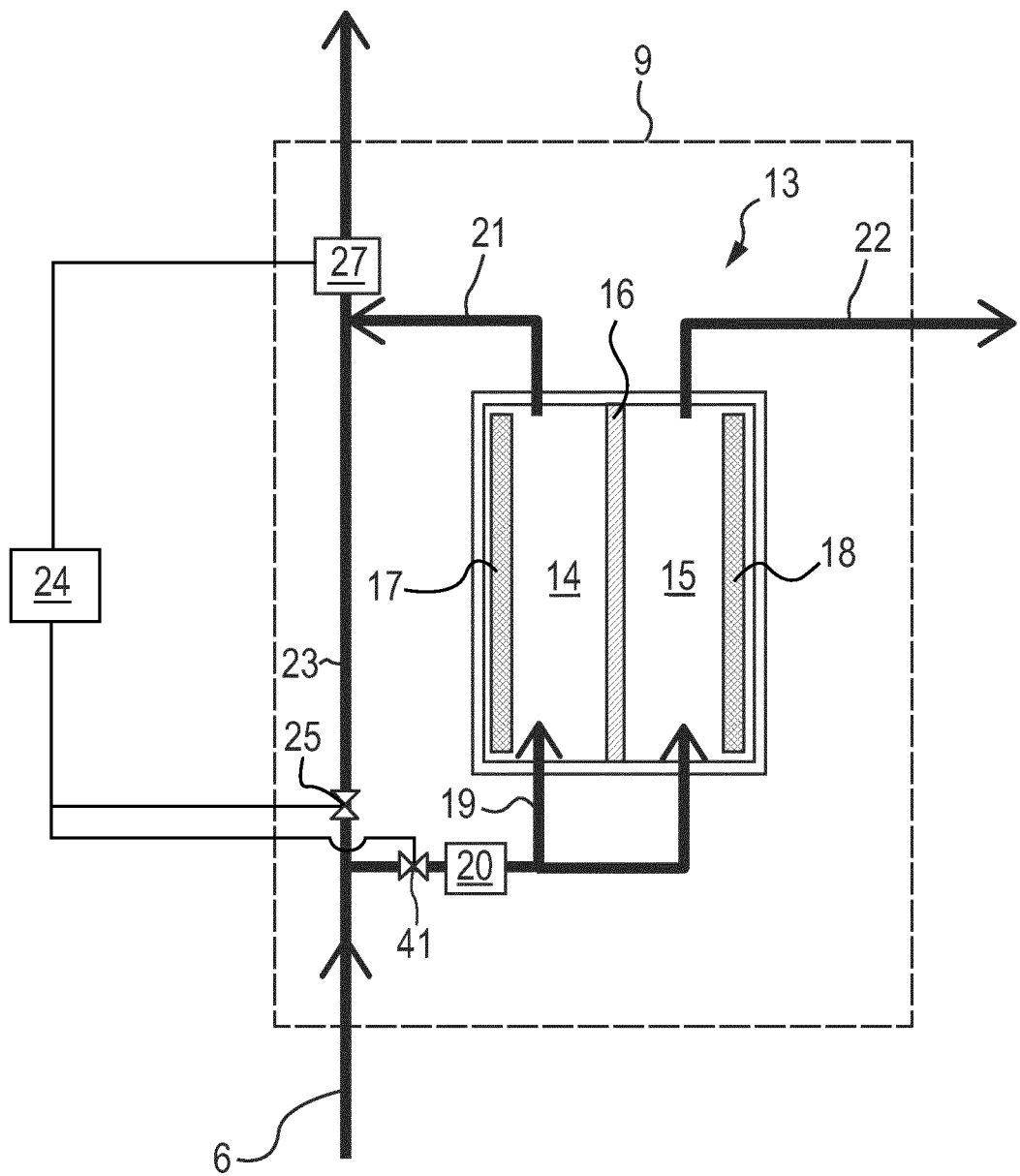
FIG. 3 is a schematic illustration of a pH adjusting system of apparatus according to the exemplary embodiment, which is shown in FIG. 2.

FIG. 3 is a schematic illustration of the pH adjusting system 7 which is arranged in the liquid supply line 6. The pH adjusting system 7 includes an electrolysis cell 13 configured to perform electrolysis of a portion of the liquid which flows through the electrolysis cell 13. The electrolysis cell 13 has an anode chamber 14 and a cathode chamber 15. The anode chamber 14 and the cathode chamber 15 are separated by an ion-exchange membrane which is permeable to ions.

The pH adjusting system 7 further includes a salt dosing device 20 for introducing an amount of salt, in particular a neutral salt, such as sodium chloride (NaCl) and/or potassium chloride (KCl) into the liquid, which is supplied to the anode chamber 14 and to the cathode chamber 15. By way of example the amount of salt is controlled so that in the anode chamber 14 and in the cathode chamber 15, a sodium chloride solution having a concentration of between 1% and 5% or between 1% and 2% is present. A DC voltage between an anode 17 which is arranged in the anode chamber 14 and a cathode 18 which is arranged in the cathode chamber 15 is within a range of between 5V and 220V, preferably between 20V and 90V. This may result in a current in a range of between 0.1 and 3 A.

The electrolytic process, which takes place in the electrolysis cell 13 produces and an anolyte which is discharged from the anode chamber 14 through an anolyte discharging line 21 and a catholyte, which is discharged from the cathode chamber 18 through a catholyte discharging line 22. A downstream end of the anolyte discharging line 21 is connected to a bypass line 23, which allows a portion of the liquid within the in the supply line 6 to bypass the electrolysis cell 13. The amount of liquid which is fed into the anode chamber 14 and the amount of liquid which bypasses the anode chamber 14 is controlled using an anode chamber valve 41 and a bypass valve 25, each of which being connected to the controller 26 of the apparatus 1.

Downstream of the point, where the anolyte discharge line 21, which discharges the anolyte from the anode chamber 14, is connected to the bypass line 23, a pH sensor 27 is arranged for measuring the pH level of the liquid which is formed by combining the flow of liquid in the anolyte discharge line 21 with the flow of liquid in the bypass line 23. The pH sensor 27 is in signal communication with the controller 24. The controller 24 is configured to determine, depending on sensor signals received from the pH sensor 27 to adjust a position of the anode chamber valve 41 and a position of the bypass valve 25. This allows control of the pH level of the liquid is supplied to the vessel.

If the liquid, which is supplied to the electrolysis cell 13 is mixed with sodium chloride salt, the following chemical reaction occurs at the cathode 18 within the cathode chamber 15:

$$2H_2O + 2e^- \longrightarrow H_2(g) + 2OH^- \tag{1}$$

The generated hydroxide ions (OH—) make the catholyte alkaline.

On the other hand, in the anode chamber 14, the following chemical reactions occur, which produce chlorine (Cl2), oxygen (O2), as well as hydroxonium ions which make the anolyte acidic:

$$6H_2O \longrightarrow O_2 + 4H_3O^+ + 4e^- \tag{2}$$

$$Cl^- \longrightarrow \tfrac{1}{2}Cl_2(g) + 1e^- \tag{3}$$

The chlorine which is generated in the anode chamber dissociates according to the following reaction:

$$Cl_2+H_2O \longrightarrow HCl+HClO \qquad (4)$$

The pH adjusting system 9 which has been explained with reference to FIG. 2 is one of a plurality of possible configurations. By way of example, it is conceivable that the pH adjusting system is configured to add a pH adjuster to the liquid. A pH adjuster may be defined herein as a chemical ingredient configured to adjust the pH level of the liquid.

As is illustrated in FIG. 2, the acidic liquid which is discharged from the pH adjusting system 9, is heated by a first heater 10 which is provided in the supply line 6 of the liquid supply system 7. The first heater 10 includes a temperature sensor (not illustrated in FIG. 2) which is configured to measure the temperature of the liquid which has passed through the first heater 10. The temperature sensor is in signal communication with the controller 24. The controller 24 is configured to adjust a heating power of the first heater 10 for heating the liquid depending on sensor output of the temperature sensor.

The first heater 10 may be configured to heat the liquid to a temperature within a range of between 30° C. and 70° C., or within a range of between 40° C. and 60° C., or within a range of between 45° C. and 55° C. It has been shown that the arrangement of the first heater 10 in the liquid supply line 6 allows precise adjustment of the temperature of the liquid, which is supplied to the vessel. Furthermore, this arrangement of the first heater 10 ensures that the liquid has the desired temperature when being supplied to the vessel 1. Thereby, the time required for the soaking process can be reduced.

It has been shown that the content of phytic acid and phytate can be reduced to a lower level if the ratio of the amount of liquid to the amount of foodstuff is within a predefined range.

To this end, as is illustrated in FIG. 2, the apparatus 1 comprises an amount determining system which is configured to determine an amount of the liquid to be supplied to the vessel 2 depending on the amount of foodstuff which is to be soaked. In the exemplary embodiment, which is shown in FIG. 2, a portion 29 of the amount determining system is implemented within the controller 24. However, it is also conceivable that the amount determining system is a component of the apparatus 1 which is implemented separately from the controller.

The amount determining system includes a weighing system 36 which is configured to measure a weight of a content of the vessel 2. In the exemplary embodiment, which is illustrated in FIG. 2, the weighing system 36 has a capacity of up to 3,000 grams. The precision of the weighing system 36 is 0.1 gram. However, alternative configurations for measuring the amount of foodstuff are conceivable. By way of example, additionally or alternatively, the amount determining system may be configured to determine the amount of foodstuff using a measurement of a fill level, in particular a vertical fill level within the vessel 2. Thereby, the amount of the foodstuff measured by the amount determining system may represent an amount in volume.

By way of example, the vertical fill level may be measured using a laser beam for optical distance measurement wherein the laser beam is directed in a downward direction within the vessel 2 toward a surface 38 formed by the foodstuff contained in the vessel 2. Additionally or alternatively, it is further conceivable that the user uses an interface 31 of the apparatus 1 which is in signal communication with the portion 29 of amount determining system implemented in the controller. The interface 31 is configured for receiving input information indicative of the amount of foodstuff which is to be soaked in the soaking process. The amount determining system may be configured to determine the amount of liquid required for performing the soaking process depending on the user input and further depending on the predefined range of the ratio of the amount of liquid to the amount of foodstuff.

As is further illustrated in FIG. 2, the interface 31 further includes an interface element 28 configured to receive user input indicative of a class of the foodstuff to be soaked. By way of example, the interface element 28 is a manually-operable switch which can be switched between a plurality of positions for selecting a class from a plurality of predefined classes of foodstuff. Additionally or alternatively, it is conceivable that the interface is connectable by an input device for inputting information via the input device. The input device may be a keyboard or a mobile phone.

In the exemplary embodiment which is shown in FIG. 2, a first one of the predefined classes represents "whole grains", wherein a second class of the plurality of predefined classes represents "legumes". It is conceivable that the apparatus is configured to provide more than these two classes and/or different classes. The amount determining system is configured to determine, depending on the class selected using the control element 28, the amount of liquid to be used for the soaking process.

Specifically, if the user selects the class "whole grains", the amount determining system determines the amount of liquid so that a ratio of the amount of liquid to the amount of foodstuff is in a range of between 0.4 and 1.5 or in a range of between 0.5 and 1.3 or in a range of between 0.6 and 1.15. On the other hand, if the user, by using the interface 31, selects the class "legumes", the amount determining system determines the amount of the liquid to be supplied to the vessel 2 so that the ratio of the amount of liquid to the amount of foodstuff is within a range of between 1.5 or within a range of between 1.8 and 4 or within a range of between 2 and 3.8.

Therefore, the controller 24 determines the amount of liquid to be supplied to the vessel depending on the amount of foodstuff to be soaked and further depending on the class of foodstuff identified by the user and inputted via the interface 31. It is conceivable that the apparatus 1 includes one or more sensors for automatic or semi-automatic determination of the class of the foodstuff.

It has been shown that by selecting the amount of liquid depending on the class of foodstuff contained in the vessel, it is possible to reduce phytic acid and phytate in the foodstuff to a lower level.

After the amount of liquid to be supplied to the vessel 2 has been determined, the controller 24 operates the first supply valve 12 so that the determined amount of liquid is supplied to the vessel 2, wherein the pH level of the liquid is within a predetermined pH range and the temperature of the liquid is within a predetermined temperature range. Then, the apparatus 1 is configured soak the foodstuff in the liquid for a predetermined period of time. By way of example, the predetermined period of time amounts to 2 hours. It is conceivable that the apparatus 1 is configured to determine the soaking time depending on the class of foodstuff.

During the soaking process, the apparatus 1 operates the a second heater 32 which is in heat conductive communication with the contents of the vessel in order to keep the liquid and the foodstuff within the predefined range of temperatures. The apparatus 1 may include an additional pH sensor and/or an additional temperature sensor for measuring the pH level and/or the temperature of the contents of the vessel during the soaking process. Each of these sensors may be in signal communication with the controller 24.

After the predetermined time for the soaking process has elapsed, the liquid 4 is discharged from the vessel 2. The apparatus 1 includes a liquid discharging system 33 for discharging the liquid in which the foodstuff was immersed during the soaking process. In the exemplary embodiment, which is shown in FIG. 2, the liquid discharging system 33 is configured as a liquid drainage system having one or more openings in a bottom surface of the vessel which allows discharging the liquid through a discharging line 39 into a drainage tank 37. The discharging of the liquid 4 from the vessel 2 is controlled using a drainage valve 35 which is in signal communication with the controller 24. The vessel 2 may be at least partially arranged within the drainage tank 37.

It is conceivable that one or more pumps are provided for pumping the liquid through the discharging line 39. The liquid drainage system may include a filter 34 that is provided in the discharging line 39 for preventing foodstuff from being discharged through the drainage system. Additionally or alternatively, it is conceivable that the liquid discharging system 33 is configured as a liquid suction system, having a suction line extending from above into the vessel 2. The liquid suction system may include a suction pump for sanctioning the liquid through the suction pipe.

After the liquid has been discharged, the controller operates a second supply valve 11 in order to pump replacement liquid into the vessel 2 through supply line 40 for performing a cooking process. In the exemplary embodiment, the replacement liquid is taken from the same source (i.e. from the liquid reservoir tank 5) as the liquid which was used for soaking the foodstuff. However, it is conceivable that the replacement liquid has a different chemical composition than the liquid used for soaking the foodstuff.

Preferably, the amount of the replacement liquid is determined by the amount determining system depending on the class of foodstuff.

If the class of the foodstuff is "whole grains", the amount determining system determines the amount of the replacement liquid so that the ratio of the amount of the replacement liquid to the amount of the foodstuff is in the range of between 0.5 and 2, or between 0.7 and 1.7, or between 0.9 and 1.5. On the other hand, if the class of foodstuff selected by the user is "legumes", the amount determining system determines the amount of the replacement liquid so that the ratio of the amount of the replacement liquid to the amount of foodstuff is in the range of between 0.5 and 5, or in the range of between 0.7 and 4, or in the range of between 1 and 3.

For determining the amount of the replacement liquid, the amount determining system may use the amount of the foodstuff, as has been determined prior to the soaking process for determining the amount of liquid used for the soaking process. However, it is also conceivable, that the amount determining system is configured to determine the amount of the soaked foodstuff by measuring the amount of foodstuff after the soaking process has been completed, in particular, after the liquid used for the soaking process has been separated from the foodstuff. By way of example, after the liquid has been discharged from the vessel 2 using the liquid discharging system 33, the amount determining system may determine a weight of the foodstuff using the weighing system 36.

Figure 4:
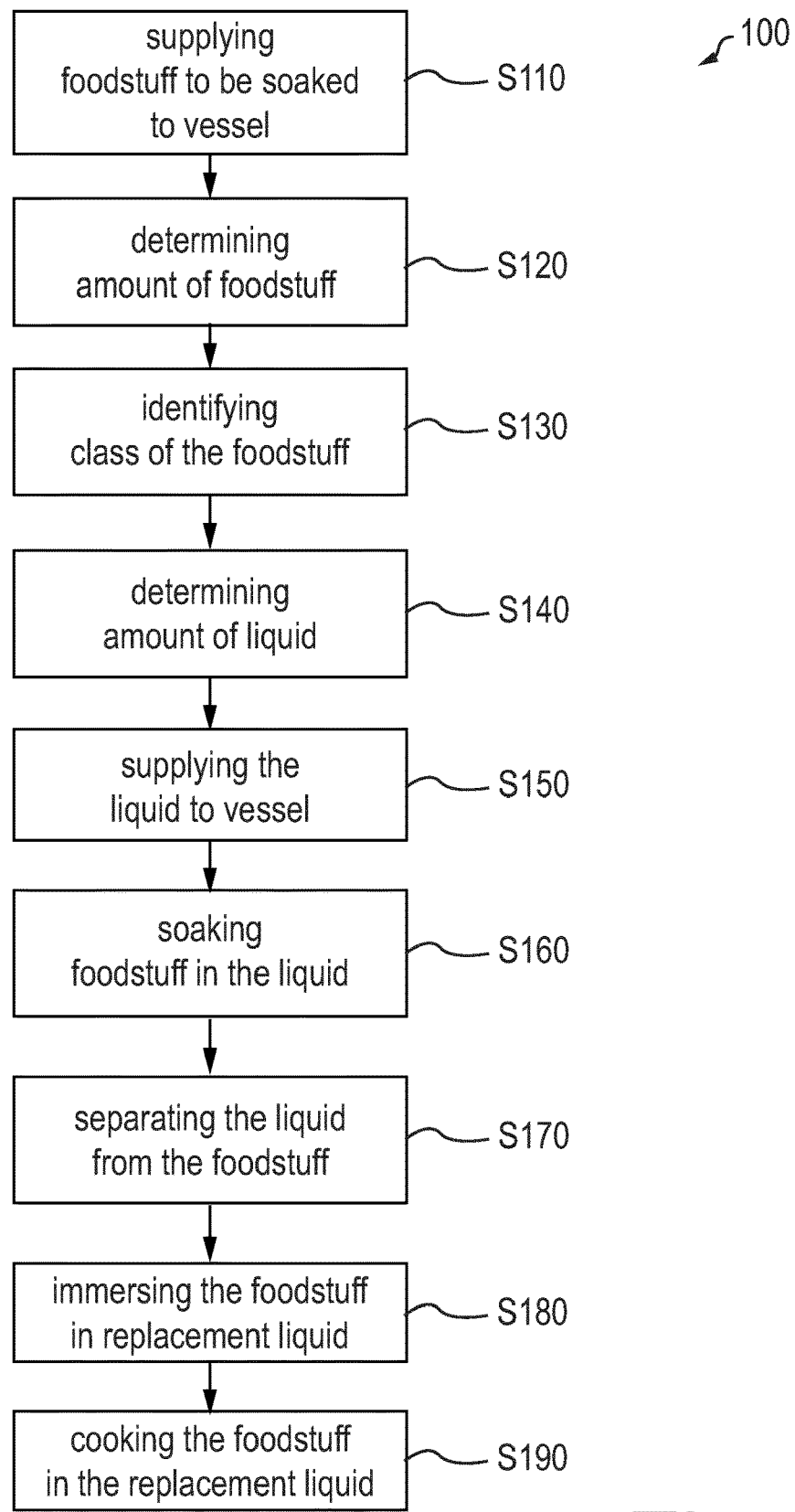
FIG. 4 is a flow chart of an exemplary method for treating foodstuff by soaking so as to reduce a content of phytic acid and/or phytate contained in the foodstuff.

FIG. 4 is a flowchart illustrating an exemplary method 100 which may be carried out using the apparatus of the exemplary embodiment as has been described in connection with FIGS. 2 and 3.

Foodstuff is supplied S110 to a vessel in which the foodstuff is to be soaked. The liquid used for the soaking process may consist of water or may substantially consist of water. The liquid may contain water as a primary component. It is conceivable that the liquid contains further ingredients in addition to water. The soaking of the foodstuff is performed so that during the soaking process, a ratio of an amount of the liquid to the amount of the foodstuff corresponds to a predefined value or is within a predefined range. The amount of liquid which is used for the soaking process is determined depending on the predefined value and/or depending on the predefined range for the ratio of the amount of liquid to the amount of foodstuff. The amount of the liquid is further determined depending on the class of the foodstuff to be soaked.

In order to determine S120 the amount of the foodstuff to be soaked, the foodstuff is weighed. It is conceivable that the foodstuff is weighed when being contained in the vessel and/or before being supplied to the vessel. Additionally or alternatively, other automatic and/or semiautomatic methods for determining the amount of the foodstuff are conceivable. The determining S120 of the amount of foodstuff may include determining an amount by weight and/or an amount by volume of the foodstuff.

The exemplary method further includes identifying S130 a class of the foodstuff from a plurality of predefined classes of foodstuff. By way of example, the predefined classes may include "whole grains" and "legumes". However, it is also conceivable that further and/or different classes are predefined. Each of the predefined classes is associated with a predefined value and/or a predefined range of values for the ratio of the amount of liquid to the amount of foodstuff. The identified class may be input by a user via an interface. By way of example, the interface may be a user interface, which includes one or more user interface elements, such as buttons or switches, which may be manually operable. It is conceivable that the content of phytic acid and/or phytate in the foodstuff can be obtained without taking care of the class of the foodstuff, i.e. by using a single predefined value or a single predefined range for the ratio of the amount of liquid to the amount of foodstuff.

The exemplary method further includes the step of determining S140 the amount of liquid, which is used for soaking the foodstuff. The amount of the liquid is determined depending on the determined amount of foodstuff and the identified class of the foodstuff. The determining S140 of the amount of the liquid may be performed by the apparatus for soaking the foodstuff automatically or semi-automatically (i.e. using user interaction). The exemplary method further includes supplying S150 the determined amount of liquid to the vessel. The supplying S150 of the determined amount of liquid to the vessel may be performed automatically or semi-automatically (i.e. using user interaction).

The liquid, when being supplied to the vessel, may have a temperature value and/or a pH level, within predefined ranges. This may be achieved by providing heater and/or a pH adjusting system within a liquid supply system for supplying the liquid to the vessel. However, it is also conceivable that the temperature and/or the pH level of the liquid, which has been supplied to the vessel is adapted after the liquid has been supplied to the vessel.

After the liquid has been supplied to the vessel, the foodstuff is soaked S160 in the liquid for a predetermined period of time. The soaking time may be longer than 10 minutes, or longer than 20 minutes, or longer than 30 minutes, or longer than 60 minutes.

After the soaking process has been completed, the liquid is separated S170 from the foodstuff. After the liquid has been separated from the foodstuff, the foodstuff is immersed S180 in a replacement liquid for cooking S190 the foodstuff in the replacement liquid and/or for treating the foodstuff in the replacement liquid at temperatures higher than 80° C. or at temperatures higher than 90° C. for a predetermined period of time. The predetermined period of time may be longer than 5 minutes, longer than 15 minutes or longer than 20 minutes.

The replacement liquid may be water or substantially water. It is also conceivable that the replacement liquid contains further ingredients in addition to water. The replacement liquid may contain water as a primary component.

The amount of the replacement liquid may be determined depending on the amount of the soaked foodstuff or depending on the amount of foodstuff determined before the soaking process. A ratio of the amount of the replacement liquid to the amount of the soaked foodstuff (or to the determined amount of the foodstuff before soaking) may be a predefined value and/or may be within a predefined range of values. The predefined values and/or the predefined range of values may be determined depending on the class of the foodstuff.

Therefore, the above-described exemplary apparatus and exemplary method allows a more efficient food preparation for reducing the content of phytic acid and/or phytate in food.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In particular, although the invention has been described based on a projection radiograph, it can be applied to any imaging technique which results in a projection image. In the claims, the word "comprising" does not exclude other elements or steps, and the indefinite article "a" or "an" does not exclude a plurality. Any reference signs in the claims should not be construed as limiting the scope.

The invention claimed is:

1. An apparatus for soaking foodstuff in a liquid under set acid pH conditions of the liquid which are set by the apparatus so as to reduce a content of phytic acid and/or phytate contained in the foodstuff;
   wherein the apparatus comprises:
   a vessel for receiving the foodstuff for receiving the liquid for soaking the foodstuff within the vessel;
   an amount determining system which is configured to determine an amount of the liquid and/or an amount of the foodstuff to be used for the soaking within the vessel; and
   a pH adjusting system configured to perform an electrolysis of at least a portion of the liquid for adjusting a pH level of the liquid.

2. The apparatus of claim 1, wherein the amount determining system is configured to determine an amount of the foodstuff and/or an amount of the liquid when contained in the vessel.

3. The apparatus according to claim 1, wherein the amount determining system comprises a weighing system.

4. The apparatus of claim 3, wherein the weighing system is configured to weigh a content contained in the vessel.

5. The apparatus of claim 1, further comprising a liquid supply system configured to supply a set amount of the liquid to the vessel;
   wherein the set amount of the liquid is determined by the amount determining system depending on the determined amount of the foodstuff.

6. The apparatus of claim 1, wherein the amount determining system is configured to determine the amount of the liquid depending on a class of the foodstuff; wherein:
   the apparatus comprises an interface for receiving user input indicative of the class of the foodstuff; and/or
   the apparatus is configured to determine the class of the foodstuff.

7. The apparatus according to claim 1, wherein the pH adjusting system is configured to adjust the pH level of the liquid to a value within a range of between 4 and 6.5, or within a range of between 4.5 and 6.0, or within a range of between 4.5 and 5.6.

8. The apparatus of claim 1, wherein the apparatus is configured to execute a temporal heating profile which comprises a temperature level within a temperature range of between 30° C. and 70° C., or between 40° C. and 60° C., or between 45° C. and 55° C.;
   wherein the temperature level is within the temperature range for a time period of between 1 hour and 3 hours or for time period of between 1.5 hours and 2.5 hours.

9. A method of treating foodstuff for reducing a content of phytic acid and/or phytate contained in the foodstuff by soaking using an apparatus,
   the method comprising:
   supplying an amount of the foodstuff and an amount of a liquid to a vessel of the apparatus;
   determining the amount of the foodstuff and/or the amount of the liquid using an amount determining system of the apparatus;
   adjusting the pH level of the liquid within a range of acid pH levels using a pH adjusting system of the apparatus, wherein the pH adjusting system is configured to perform an electrolysis of at least a portion of the liquid; and
   soaking the foodstuff and the liquid under a set acid pH condition of the liquid, which is set by the apparatus.

10. The method of claim 9, wherein the amount of the liquid and the amount of the foodstuff is determined so that a ratio of the amount of the liquid to the amount of the foodstuff is substantially a predefined value and/or is within a predefined range.

11. The method according to claim 10, further comprising: selecting the predefined value and/or the predefined range from a plurality of predefined values and/or predefined ranges which are associated with different classes of foodstuff.

12. The method according to claim 10, wherein the predefined value and/or the predefined range is within a range of between 0.4 and 1.5, or between 0.5 and 1.3, or between 0.6 and 1.15 if the foodstuff includes or substantially consists of whole grains.

13. The method according to claim 10, wherein the predefined value and/or predefined range is within a range of between 1.5 and 4.5, or between 1.8 and 4, or between 2 and 3.8 if the foodstuff includes or substantially consists of legumes.

* * * * *